(12) United States Patent
Rodriguez

(10) Patent No.: US 6,330,962 B1
(45) Date of Patent: Dec. 18, 2001

(54) EYEGLASS HOLDER

(76) Inventor: Luis Rodriguez, 8008 Cascadas Ave., North Port, FL (US) 34287-1636

( * ) Notice: Subject to any disclaimer, the term of this patent is extended or adjusted under 35 U.S.C. 154(b) by 0 days.

(21) Appl. No.: 09/699,668

(22) Filed: Oct. 30, 2000

(51) Int. Cl.$^7$ ................................................... A44B 21/00
(52) U.S. Cl. ............................... 224/246; 24/3.3; 24/3.4; 224/607
(58) Field of Search .................................. 224/607, 623, 224/246; 24/3.3, 3.4, 3.13

(56) References Cited

U.S. PATENT DOCUMENTS

| | | |
|---|---|---|
| D. 178,995 | 10/1956 | Glover . |
| 553,325 | 1/1896 | Zestermann . |
| 1,931,286 | 10/1933 | Drew . |
| 2,884,220 | 4/1959 | Manley . |
| 4,715,575 * | 12/1987 | Kamerer ................................ 248/309 |
| 4,867,402 | 9/1989 | Benson . |
| 5,078,484 | 1/1992 | Vaughn . |
| 5,305,934 | 4/1994 | Grey . |
| 5,319,838 | 6/1994 | Eppenauer . |
| 5,351,098 * | 9/1994 | McDaniels et al. .................... 24/535 |
| 5,551,126 | 9/1996 | Wallo . |
| 5,619,774 * | 4/1997 | Perry ...................................... 24/3.6 |
| 5,864,924 * | 2/1999 | Rodriguez ............................... 24/3.3 |
| 5,893,198 * | 4/1999 | DeCotis ................................. 24/3.3 |
| 5,966,783 * | 10/1999 | Genereux et al. ...................... 24/557 |
| 5,983,459 * | 11/1999 | Goldenberg ............................ 24/3.3 |
| 6,070,303 * | 6/2000 | Macy et al. ............................. 24/3.3 |

OTHER PUBLICATIONS

Starcrest of California Eyeglass Pins advertisement.

* cited by examiner

*Primary Examiner*—Stephen P. Garbe
(74) *Attorney, Agent, or Firm*—Charles J. Prescott

(57) ABSTRACT

An eyeglass holder attachable around the neck of, or to an article of clothing worn by the user for supporting a pair of eyeglasses. The eyeglasses are supported facing away from the user by the bridge and folded stems of the eyeglasses. A biasingly extendable retaining member elastically holds the bridge from substantial movement while enhancing adaptability of the device to a very broad range of eyeglass sizes and shapes. A support member which receives the bridge of the eyeglasses preferably includes a length of deformable wire or the like molded within, and extending at least part way through, the upright member and the support member which allows the support member to be repositioned for better eyeglass stem support and retention.

5 Claims, 4 Drawing Sheets

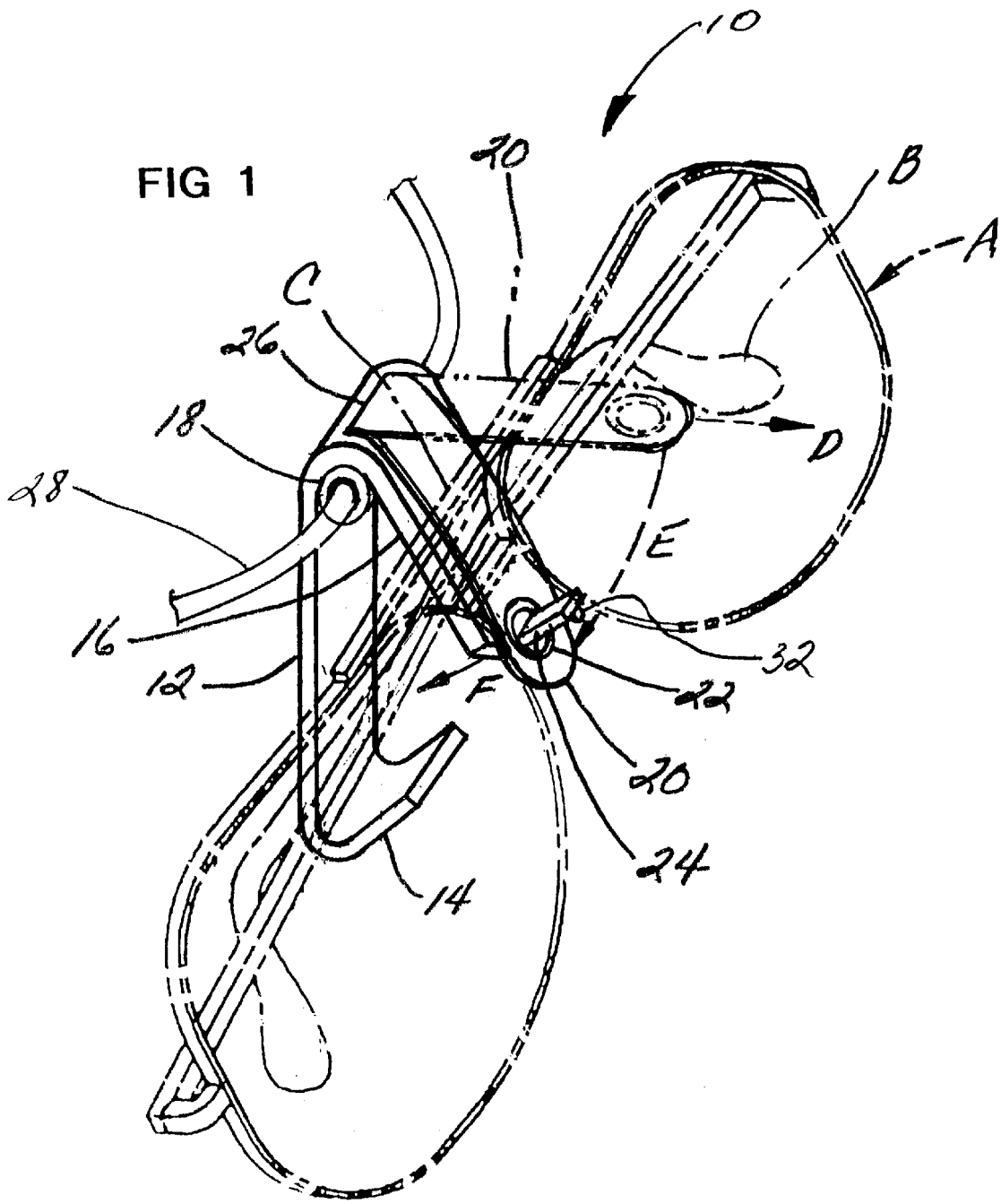

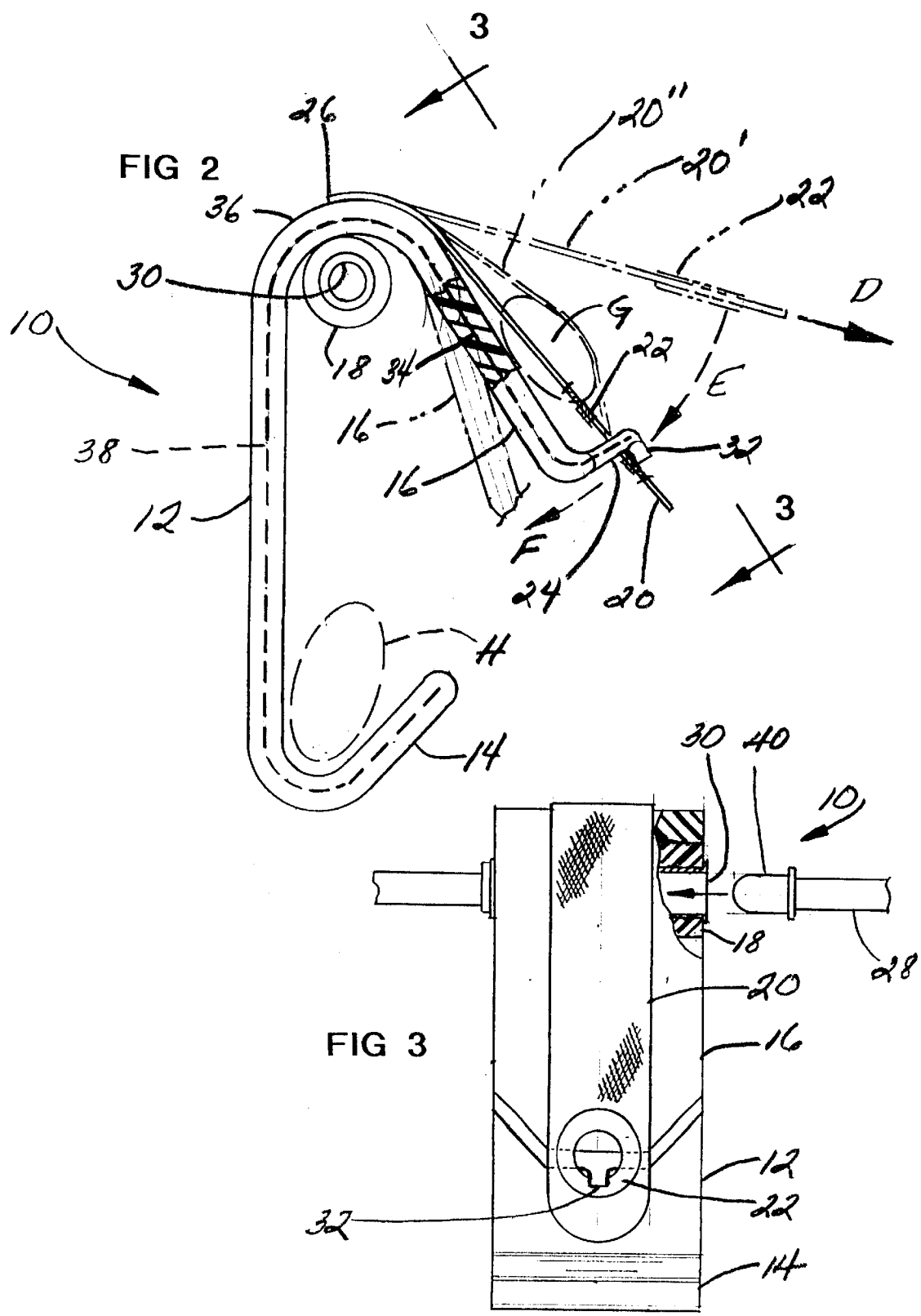

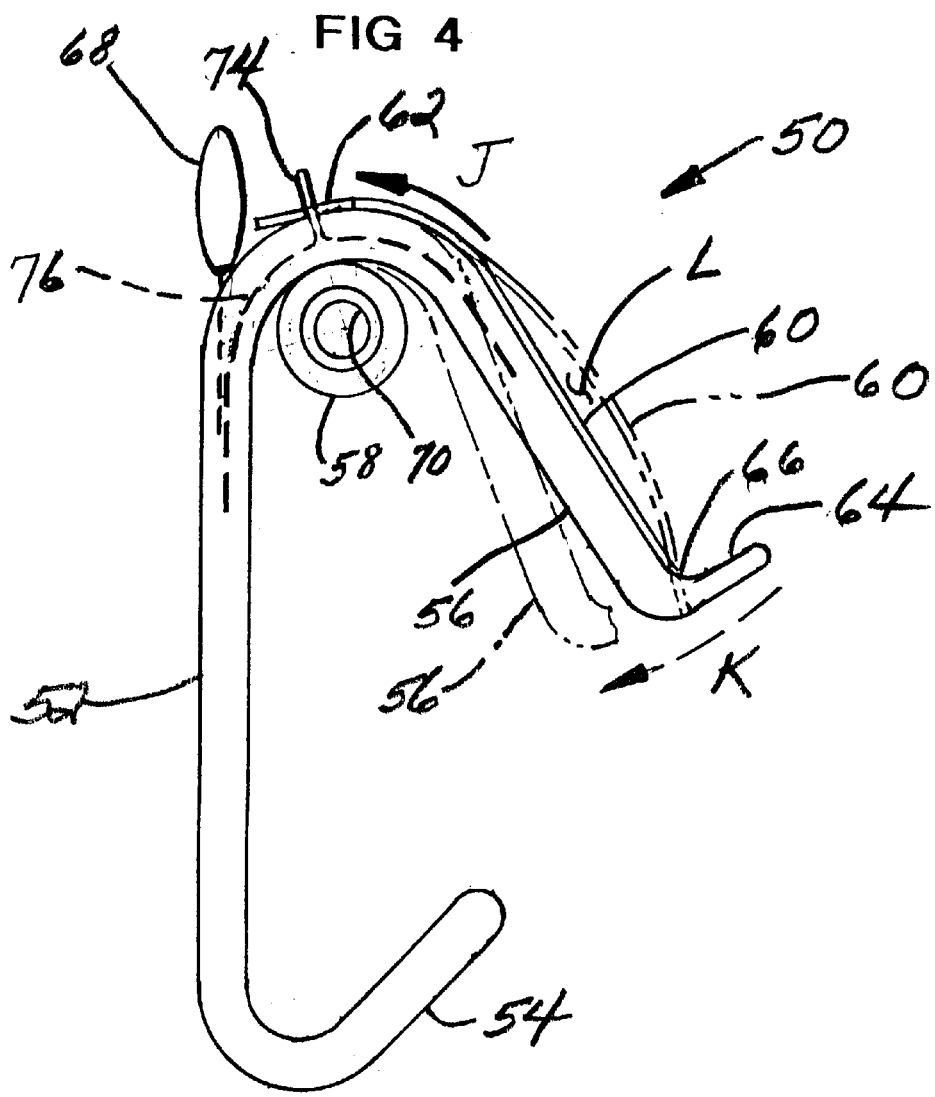
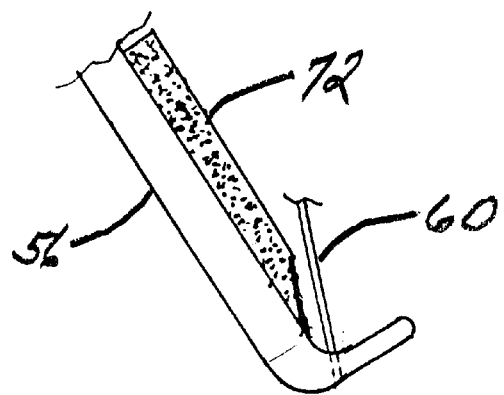

EYEGLASS HOLDER

BACKGROUND OF THE INVENTION

1. Scope of Invention

This invention relates generally to eyeglass holders, and more particularly to an eyeglass holder which will retain the eyeglasses in a particular orientation without substantial movement with respect to the neck or clothing of the user.

2. Prior Art

Many people wear eyeglasses and all are challenged with having a convenient and safe place to carry the eyeglasses which is both safe and renders the eyeglasses easily accessible. Even with the advent of very effective and convenient contact lenses, still a great deal of people must rely on conventional eyeglasses. Although manufacturers of eyeglasses typically provide a case for this purpose, the convenience of utilizing a case for both protection and carrying represents more of an inconvenience to the user than the benefits derived therefrom.

A well-known solution for carrying eyeglasses is simply to connect a cord from each distal end of each of the temples or side pieces of the eyeglasses, which cord is draped around the back of the neck to hold the eyeglasses in a downwardly position at the chest area when not in use However, the eyeglasses when held in the non-use position with these neck cords typically dangle and swing about, increasing the likelihood of damage, excessive abuse and even loss.

A patented device disclosed in U.S. Pat. No. 5,305,934 invented by Grey teaches a combination tool and eyeglass holder which is also hung about the neck by a flexible cord. This device includes a ring for attachment of one of the eyeglass temples inserted therethrough and further includes a horizontally positioned container for holding a small eyeglass screwdriver for adjustments. However, in Grey the eyeglasses are still free to swing or pitch about when not in use, thus not providing much more in the way of eyeglass protection than the previously described neck cord connected to each of the ends of the eyeglass temples.

Vaughn, in U.S. Pat. No. 5,078,484, teaches a lapel pin eyeglass and pillbox combination, but in this device as well, the eyeglasses are held by one of the temples in the folded position and the eyeglasses are again free to dangle and swing about and would appear to be in some jeopardy of being completely disengaged because of the "J" shape of the hook for eyeglass retention.

Another eyeglass holder is disclosed in U.S. Pat. No. 5,319,838 invented by Eppenaur wherein an eyeglass holder may be attached to the user similar to that of a pendant or connected to a necklace worn by the user. This device also presents a horizontal loop into which one temple of the eyeglasses may be inserted for supportive retention. However, once again, the dangling and swinging of the eyeglasses about the single tension support arrangement leaves a great deal to be desired in terms of both protection and stability of the eyeglasses when not in use.

A button-on holder for eyeglasses is taught by Wallo in U.S. Pat. No. 5,551,126 in which a very simple yet unobtrusive eyeglass hanger is disclosed. This eyeglass holder is attached to a button on the front of a shirt or blouse, one stem of the eyeglasses insertable through the bottom portion of the aperture for receiving the button. Although this device perhaps lends a bit more stability to the hanging eyeglasses because they press against the body of the user by the front or back area of the folded eyeglasses, nonetheless dangling and swinging of the stored eyeglasses is likely even with this device.

I recently invented an eyeglass holder disclosed in U.S. Pat. No. 5,864,924 which overcomes many of the above limitations of unwanted eyeglass movement when held in a stored position on the user's torso or clothing. However, the complexity of manufacture has rendered this patented invention somewhat expensive to manufacture. Moreover, because of the broad range of eyeglass sizes, a "one size fits all" device under my '924 patent has proved to be elusive.

The present invention overcomes these limitations of unwanted eyeglass movement when in a stored position while also providing the desirable "one size fits all" and manufacturing economy benefits. With the present invention, very little eyeglass movement, if any, is likely and eyeglasses of all sizes are always held in a stable position for ease in convenient removal and restoring.

BRIEF SUMMARY OF THE INVENTION

This invention is directed to an eyeglass holder attachable around the neck of, or to an article of clothing worn by the user for supporting a pair of eyeglasses. The eyeglasses are supported facing away from the user by the bridge and folded stems of the eyeglasses. A biasingly extendable retaining member elastically holds the bridge from substantial movement while enhancing adaptability of the device to a very broad range of eyeglass sizes and shapes.

It is therefore an object of this invention to provide an eyeglass holder which will retain the eyeglasses in a substantially stationary position with respect to the user so as to minimize the likelihood of eyeglass damage and annoyance from unnecessary movement.

It is another object of this invention to provide an eyeglass holder which is easily attachable in various ways against the body and/or clothing of the user.

It is yet another object of this invention to provide an eyeglass holder for storing eyeglasses when not in use against the body of the user wherein the eyeglasses may be stored and secured from substantial movement in either a temples open or a temples closed orientation.

It is still another object of this invention to provide a one-size fits all device for holding eyeglasses which is easily adaptable to various eyeglass sizes and is economical to manufacture.

In accordance with these and other objects which will become apparent hereinafter, the instant invention will now be described with reference to the accompanying drawings.

BRIEF DESCRIPTION OF THE DRAWINGS

FIG. 1 is a perspective view of the preferred embodiment of the invention shown with a pair of eyeglasses (temples closed position) being supported thereby shown in phantom.

FIG. 2 is a side elevation broken view of the invention as shown in FIG. 1.

FIG. 3 is a broken view in the direction of arrows 3—3 in FIG. 2.

FIG. 4 is a side elevation view of another embodiment of the invention.

FIG. 5 is a side elevation view of a variation of the embodiment in FIG. 4.

DETAILED DESCRIPTION OF THE INVENTION

Figure 6:
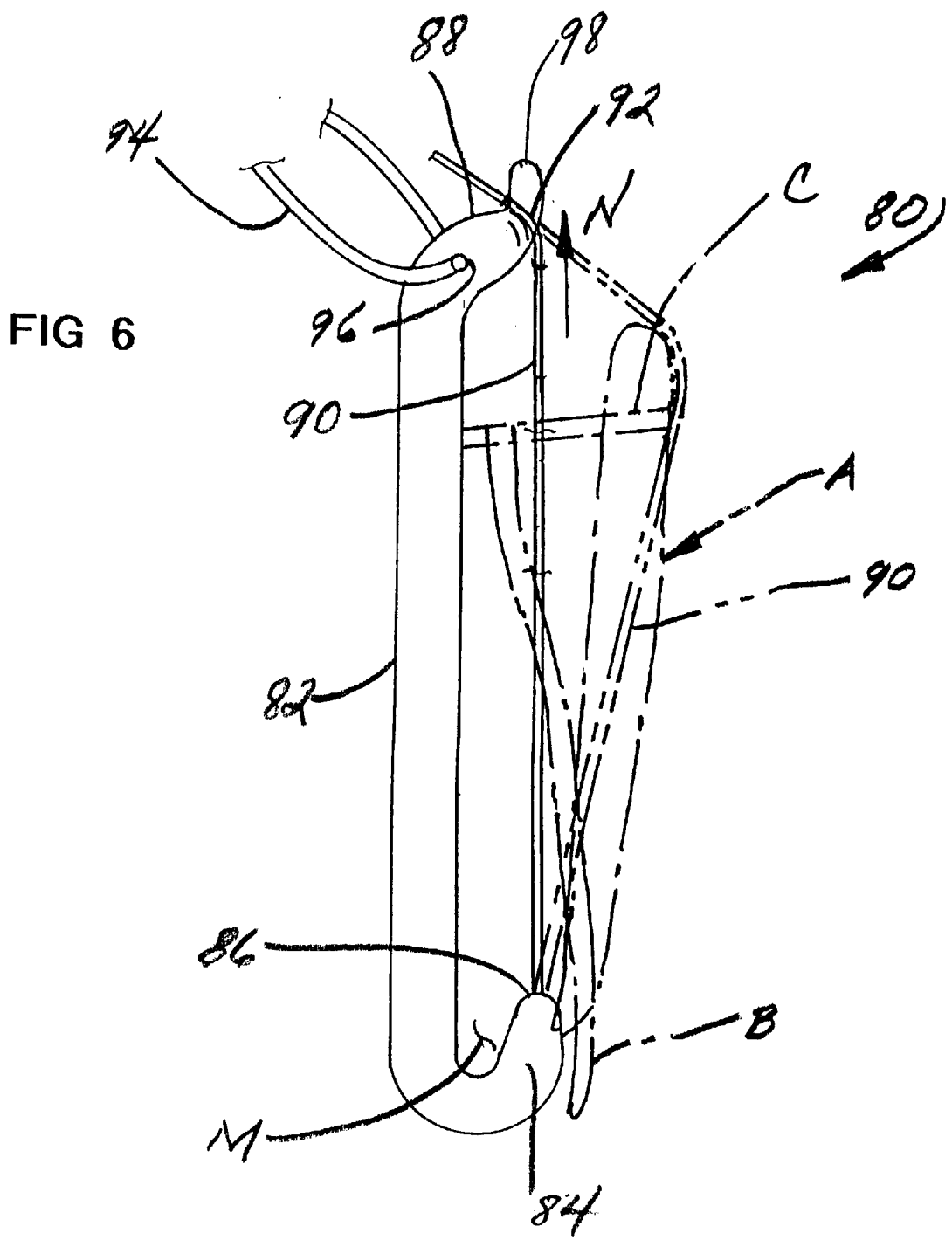
FIG. 6 is a side elevation view of yet another embodiment of the invention.

Referring now to the drawings, and firstly to FIGS. 1 to 3, the preferred embodiment of the invention is generally shown at numeral 10 and includes an elongated generally flat rigid or semi-rigid molded plastic upright member 12 and a downwardly disposed plastic support member 14 dependently extending generally diagonally from an upper end of upright member 12. When viewed from the side as seen in FIG. 2, the upright member 12 and eyeglass bridge support member 16 combine to have the appearance of an inverted "Y" shape.

A pair of eyeglasses are shown generally at numeral A and include a central bridge C and pivotally connected temples or side-members shown at B. The present invention utilizes the structure of both the bridge C and temples B to effect supportive retention of the eyeglasses A as described herebelow.

Disposed at the lower end of the upright member 12 is an upturned portion 14 which extends diagonally upwardly from the upright member 12 and from the same side or direction therefrom as does the support member 16. This upturned portion 14 defines a secondary eyeglass support zone or area H seen in FIG. 2 for supportingly receiving the temples B of the eyeglasses A when in the folded orientation as shown in FIG. 1.

Support member 16 is sized in length to accommodate a broad range of bridge sizes which will fit and rest thereagainst with the eyeglasses A oriented in an outwardly facing position shown in FIG. 1. In the embodiment 10 the temples B are oriented in a closed position so that they are positioned downwardly and receive support within the secondary support area H by upturned portion 14.

The device 10 is preferably molded as a unit utilizing a modeling polymer clay marketed by Polyform Products Co., Inc. under the trademark SCULPEY SUPER FLEX™. This product includes PCT and a plasticizer (phtlalic esters).

Once the bridge C of the eyeglasses A is placed against the outwardly facing surface of support member 16 in the region of area G in FIG. 2, an elastic retaining member or strap 20 which is attached at 26 to the outer surface of arcuate portion 36, is stretched elastically in the direction of arrow D. An apertured fitting 22 attached adjacent the distal end of the retaining strap 20 is then fitted over a prong 32 which extends from and is laterally offset from the lower end of support member 16. The retaining member 20, once stretched into the position shown in phantom at 20', is then conformingly engaged around the bridge C within area G by movement in the direction of arrow E and then retained over prong 32 within apertured fitting 22. By this arrangement of the elastic retaining strap 20, virtually any bridge configuration of eyeglasses may be accommodated. The folded temples B of the eyeglasses A will then be positioned within area H defining the secondary support for the eyeglasses. The upturned portion 14 and the upright member 12 define this secondary support area H to accomplish this additional support and eyeglass stabilization.

Another important aspect of the present invention is also shown in FIG. 2 and includes an elongated length of deformable wire 34 which is embedded into the device 10 at molding manufacture. This deformable length of wire 34 may extend end-o-end of the device as shown in hidden lines and in solid lines within the broken area of the support member 16. The beneficial feature of this embedded deformable wire 34 is that the support member 16 may be easily manually non-resiliently deformed in the direction of arrow F into another selected position shown in phantom once the eyeglasses A are in the position above described. This affords a positive and accurate adjustment of the relative spacing between areas G and H so that the folded temples B of the eyeglasses A will take a more engaged and positively supported position within the secondary support area H. Likewise, in the embodiment shown, the upturned portion 14 may also be deformed and take a new angular orientation with respect to the upright member 12 again by manual manipulation and deformation of the embedded deformable wire 34.

Note that, although the deformable wire length 34 extends as shown throughout the entire device, it may be foreshortened at 38 so that, although there is resiliency associated with the lower end of the upright member 12 and the upturned portion 14, the deformable aspect is not present in doing so.

Two means for retaining the device 10 in position with respect to a user's clothing are shown in this disclosure. Primary support is received from around the neck of a user by providing an elongated flexible cord 28 which mateably engages into a cylindrical aperture 30 formed at each end of a tubular support member 18 which is, in turn, attached to the arcuate portion 36 extending between upright member 12 and support member 16. As best seen in FIG. 3, each end of the cord 28 includes a metal fitting 40 which is snugly retained within the opening 30 when inserted together in the direction of the arrow thereshown.

Referring now to FIGS. 4 and 5, another embodiment of the invention is there shown generally at numeral 50 formed as a unit of molded plastic material as above described. This embodiment 50 also includes an upright member 52 having an upturned portion 54 at its lower end and a diagonally and downwardly extending support member 56 disposed from an arcuately configured upper end thereof. An elongated elastic retaining strap 60 is attached at its lower end at 66 to outturned support flange 64 disposed at the lower distal end of support member 56. When elastically extended in the direction of arrow J, an aperture 62 formed at the distal end of retaining strap 60, is engageable over prong 74. This prong 64 is formed as a "bight" of an elongated deformable wire member 76 which is embedded within the device at its molding. Note that, although the deformable wire 76 extends only generally through the arcuate portion positioned between upright member 52 and support member 56, nonetheless the deformable substantially non-resilient bendable feature as shown in the direction of arrow K effects the permanent reconfiguration of the relationship between the support member 56 and the upright member 52 to better accommodate a broad range of eyeglass sizes.

As with respect to the prior embodiment 10, the elastic retaining member 60 would take a typical position or orientation shown in phantom to positively envelope the bridge of the eyeglasses (not shown in FIG. 4) within area L for positive retention while the stems of the eyeglasses in their folded position would be supported between the lower end of the upright member 52 and its upturned portion 54. An additional attaching means to the user or article clothing is in the form of a loop 68 which may be attached to a button of a shirt or to a necklace or other similar support device worn by the user.

In FIG. 5, the addition of a resiliently compressible pad or sheet 72 has been added to the support member 56 of FIG. 4 so as to provide better conforming engagement between the bridge of the eyeglasses and the sheet of foam 72.

Referring lastly to FIG. 6, another embodiment of the invention is there shown at 80. This embodiment 80 is somewhat simpler in form and concept and includes an elongated upright member 82 and an upturned portion 84 extending therefrom at its lower end to define a secondary support area M. Disposed from the upper end of the upright member 82 is an elastic retaining member support 88 having an upwardly extending prong 98 which receives an aperture 92 formed adjacent a distal end of an elastically extendable retaining member or band 90. As with the previous embodiments, the elastic retaining member 90 must be extended in the direction of arrow N by manual stretching to establish engagement of aperture over prong 98 and, when the eyeglasses A are in the position shown in phantom, the elastic retaining member 90 stretches further into a typical position shown in phantom to entrap and hold the bridge C of the eyeglasses A in position against the outwardly facing surface of upright member 82.

A flexible necklace 94 permanently attached at 96 into the upper support member 88 is also provided as one means of attachment to the user. Other means for accomplishing this user attachment are disclosed in my earlier U.S. Pat. '924 and are hereby incorporated by reference.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. An eyeglass holder of the type used for securely supporting a pair of eyeglasses having temples and a bridge comprising:

an elongated rigid or semi-rigid upright member having an upper end thereof from which an elongated rigid or semi-rigid support member dependently extends laterally downwardly from said upper end, said support member having sufficient length to supportively receive the bridge of the eyeglasses thereagainst with the temples in a closed position and oriented downwardly;

a lower end of said upright member upturned and extending from said upright member in the same direction as that of said support member and having a length sufficient to form a secondary support for the temples of the eyeglasses when the bridge of the eyeglasses is positioned against the support member;

an elongated substantially elastic bridge retaining member elastically extendable and connectable between a distal end of said support member and said upper end, said retaining member biasingly acting to hold the bridge of the eyeglasses against said support member with the stems supportively positioned in said secondary support;

a body support member for supportively attaching said eyeglass holder to a user whereby said upright member is held against the user with said support member extending downwardly away from the user when the bridge of the eyeglasses rests against said support member and retained thusly by said retaining member when the stems are in the closed position.

2. An eyeglass holder as set forth in claim 1, wherein:

said support member is manually non-elastically deformable in angular orientation with respect to a main portion of said upright member whereby the closed stems of the eyeglasses are more positively engaged and retained in said secondary support to accommodate a broad range of eyeglass sizes.

3. An eyeglass holder as set forth in claim 2, further comprising:

a resiliently compressible pad attached to, and in a region of, said support surface against which the bridge of the eyeglasses are positioned thereby further securing the eyeglasses.

4. An eyeglass holder as set forth in claim 3, wherein:

said upturned lower end is manually non-elastically deformable in angular orientation with respect to a main portion of said upright member whereby a size and shape of said secondary support will accommodate a broad range of stem sizes.

5. An eyeglass holder as set forth in claim 4, wherein:

said upright and support members and said upturned lower end are molded as a unit with a length of deformable wire embedded in and extending at least partially therethrough.

* * * * *